(12) United States Patent
Panpaliya et al.

(10) Patent No.: US 8,805,273 B2
(45) Date of Patent: Aug. 12, 2014

(54) METHOD AND SYSTEM FOR ROAMING IN A PEER TO PEER NETWORK AMONG RADIO SITES HAVING DYNAMIC REST CHANNEL BASE REPEATER STATIONS

(75) Inventors: Satyanarayan R. Panpaliya, Palatine, IL (US); Dipendra M. Chowdhary, Hoffman Estates, IL (US); Hesham H. Naim, Palatine, IL (US); Shiying Ning, Palatine, IL (US); Teik Choon Teh, Penang (MY); Guo-Jin Wei, Chengdu (CN)

(73) Assignee: Motorola Solutions, Inc., Schaumburg, IL (US)

( * ) Notice: Subject to any disclaimer, the term of this patent is extended or adjusted under 35 U.S.C. 154(b) by 330 days.

(21) Appl. No.: 13/293,643

(22) Filed: Nov. 10, 2011

(65) Prior Publication Data

US 2013/0122899 A1    May 16, 2013

(51) Int. Cl.
*H04B 7/15* (2006.01)
(52) U.S. Cl.
USPC ....... 455/11.1; 455/426.1; 455/422; 455/507; 455/520; 370/341; 370/338; 370/340
(58) Field of Classification Search
None
See application file for complete search history.

(56) References Cited

U.S. PATENT DOCUMENTS 5,724,515 A * 3/1998 Barnes et al. ................. 709/236
8,045,499 B2 * 10/2011 Wiatrowski et al. .......... 370/315
8,045,982 B2  10/2011 Khoo et al.
8,139,597 B2 * 3/2012 Chowdhary et al. .......... 370/433
8,150,438 B2 * 4/2012 Bohn et al. .................... 455/518
8,358,968 B2 * 1/2013 Panpaliya et al. ............ 455/11.1
2002/0067710 A1 * 6/2002 Helm et al. ................... 370/338
2010/0085953 A1 * 4/2010 Patel et al. .................... 370/341
2012/0219005 A1 * 8/2012 Durve et al. .................. 370/400

FOREIGN PATENT DOCUMENTS

WO    WO 2010039632 A2 *  4/2010

OTHER PUBLICATIONS

PCT International Search Report Dated Jul. 15, 2013 for Counterpart Application PCT/US2012/061618.

* cited by examiner

*Primary Examiner* — Fayyaz Alam
*Assistant Examiner* — Mohammed Rachedine
(74) *Attorney, Agent, or Firm* — Daniel R. Bestor; Barbara R. Doutre

(57) ABSTRACT

In a peer to peer trunked radio network having a plurality of network locations, each network location includes a plurality of repeaters and a dynamically selected at least temporarily act as a rest channel repeater at each network location. A first repeater at the first network location may determine a first timing at which to broadcast an intra-site beacon and a second timing at which to broadcast an inter-site roaming beacon, the intra-site beacon including at least a rest channel identifier indicating a rest channel of the first network location and the inter-site roaming beacon including at least remote rest channel repeater information identifying a second repeater at a second network location that is currently acting as a rest channel repeater at the second network location. The first repeater may then broadcast the intra-site beacon at the first timing and the inter-site roaming beacon at the second timing.

21 Claims, 12 Drawing Sheets

METHOD AND SYSTEM FOR ROAMING IN A PEER TO PEER NETWORK AMONG RADIO SITES HAVING DYNAMIC REST CHANNEL BASE REPEATER STATIONS

FIELD OF THE DISCLOSURE

The present disclosure relates generally to wireless communication systems and more particularly to roaming between radio sites in a peer to peer network of radio sites having dynamic rest-channel base repeater stations.

BACKGROUND

A wide area network (WAN) is a network which covers more than one single geographical area, and uses communications circuits and systems to connect a plurality of network nodes. "Wide area" coverage is defined by a number of base repeater stations which are typically distributed geographically over an area, perhaps in a partially overlapping manner, and are connected over a wired or wireless network. Often these stations are distributed in such a way that no one station could cover the same geographic area by itself (however this isn't always the reason for such a wide area network). This enables a first mobile wireless subscriber station within coverage of a first fixed base repeater station to communicate with other (second, third, etc.) subscriber stations within coverage of remote (second, third, etc.) base repeater stations, and enables a first mobile wireless subscriber station to travel across a greater geographic area and still obtain services provided by the plurality of interconnected base repeater stations.

In other examples, a local area network (LAN) may be used to interconnect a plurality of locally-arranged base repeater stations configured so as to provide fully or partially overlapping coverage areas within a contiguous geographic region.

Wireless WANs/LANs may utilize communication technologies such as WIMAX (Worldwide Interoperability for Microwave Access), UMTS (Universal Mobile Telecommunications Service), GPRS (General Packet Radio Service), CDMA (Code Division Multiple Access), GSM (Global System for Mobile communications), CDPD (Cellular Digital Packet Data), HSDPA (High-Speed Downlink Packet Access), 3G (third generation), 4G (fourth generation), and the like, to transfer data. Wired WANs/LANs may utilize Data Over Cable Service Interface Specifications (DOCSIS), Digital subscriber line (DSL), Canopy, Ethernet, T1, or the like to transfer data.

Within a WAN or LAN (e.g., a network), a variety of communication scenarios can co-exist. For example, one use of the network is to enable a group call (i.e. one subscriber station transmitting to many subscriber stations who are listening, perhaps some of which may be distributed across the network of radio sites).

A common WAN over which group calls can be sent is the Public Internet. The Internet is a worldwide, publicly accessible series of interconnected computer networks that transmit data by packet switching using the standard Internet Protocol (IP). It is a "network of networks" that consists of millions of smaller domestic, academic, business, and government networks, which together carry various information and services.

One typical way of providing group communications amongst subscriber stations is to implement a trunked radio communications system. In a trunked radio communications system, subscriber stations use a pool of channels that are assigned on an as-needed basis for new talkgroup calls. Thus, all talkgroups are served by all channels. The trunked radio system takes advantage of the probability that not all talkgroups need a channel for communication at the same time. Estimates are made about how much load a typical user presents to the system in terms of calls per hour and duration of each call. For a traffic load, fewer channels are required since all talkgroups are served by all channels. Combining this with the number of users on the system, and the acceptable quality of service (QoS), determines how many trunked channels are required to satisfactorily serve the number of users. With a given number of channels, a much greater number of talkgroups can be accommodated as compared with conventional radio systems. Hence, a primary purpose of a trunked radio system is the efficient utilization of channels allowing for more users to carry many conversations over a fewer number of distinct channels.

A trunked radio system can be either a centralized trunked radio system or a decentralized trunked radio system. A centralized trunked radio system uses a dedicated or exclusive controller that assigns traffic channels upon request. Other terms that sometimes refer to the central controller include trunking controller, site controller, resource allocator, channel allocator, controller, and other like terms. The subscriber stations constantly monitor a control channel for channel assignment instructions from the central controller. In order to start a group call, a subscriber station requests that a channel be allocated for its use, and the central controller transmits instructions telling the subscriber stations in the group to switch to a traffic channel assigned for that call.

A decentralized trunked radio system, however, does not require the use of an exclusive controller. The intelligence or control function for assignment of a channel to a call is distributed amongst base repeater stations and/or subscriber stations in the wireless communications network. For example, in one case one of the base repeater stations out of the plurality of base repeater stations may be designated a rest channel repeater, and all subscriber stations will idle on the channel (e.g., the rest channel) assigned to the rest channel repeater (the rest channel) and monitor the rest channel for new calls. Requests to start a new call will be received by the rest channel repeater and assigned a traffic channel. All subscriber stations wishing to participate in the new call will then move to the new traffic channel for the call, and once completed, return to the rest channel. The particular repeater designated as a rest channel repeater may change from time to time, perhaps due to detected interference and/or start-up rest channel arbitration procedures between repeaters at a radio site.

In another case, a new call request received at a rest channel repeater will be assigned to the current rest channel as the traffic channel for the new call. In this case, instead of those subscriber stations not participating in the new call remaining on the rest channel, those subscriber stations not participating in the new call move to a new rest channel while those subscriber stations wishing to participate in the new call remain on the old rest channel (which has now become a traffic channel for the new call). The new rest channel may be assigned and/or detected in a number of different ways.

Because the rest channel at a decentralized trunked radio system may change over time, it becomes difficult for a subscriber station roaming between geographic areas covered by varying base repeater stations to discover what channel any one particular base repeater station is currently using as a rest channel (e.g., the only channel that is continuously or periodically keyed-on by the repeater) and thus becomes difficult for the subscriber station to sample signal strengths of neighboring coverage areas. Because the subscriber station must search for a current rest channel at each potential neighboring site, the amount of time it takes for the subscriber station to determine if it would be advantageous to hand-off service increases, and the chance that the subscriber station misses a call announcement in its current geographic coverage area increases (as it scans for rest channels in neighboring areas for measurements). Accordingly, there is a need for a method and system for more efficiently scanning and roaming between radio sites in a network of interconnected radio sites having dynamic rest-channel base repeater stations.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
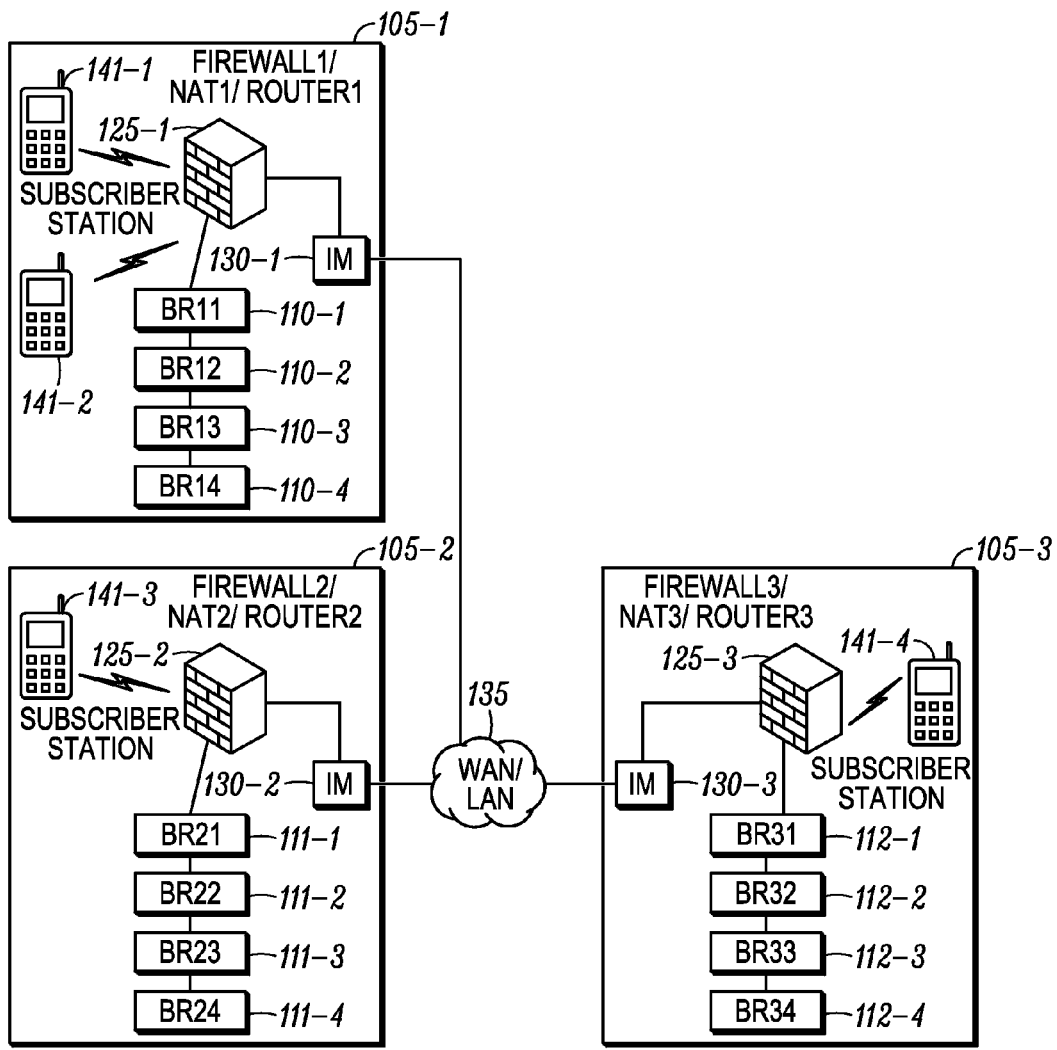
FIG. 1 is a block diagram of an example of multiple decentralized trunked radio sites having dynamic rest channels connected via a wide area network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides for the interconnection of multiple decentralized trunked radio sites having dynamic rest channels over a network. Each radio site operates as a peer within a peer to peer (P2P) topology where the "Peers" talk directly without go-betweens or other centralized and/or intervening control structures or entities. Peer-to-peer is a communications model in which each party has the same capabilities and either party can initiate a communication session. The present disclosure provides for a method and system for efficiently roaming between peer to peer interconnected networks of base repeater stations at decentralized trunked communication sites having dynamic rest channels.

I. System Architecture

FIG. 1 is a block diagram of an example interconnected network system of decentralized trunked radio sites 100, each radio site having a dynamic rest channel in accordance with embodiments of the present disclosure. As illustrated, the system 100 includes a plurality of decentralized trunked radio sites 105-$n$, each associated with a different (but perhaps overlapping) geographic coverage area. Within each radio site 105-$n$, an Internet Modem (IM) 130-$n$ operatively couples each radio site 105-$n$ to a WAN/LAN 135, which in one embodiment, may be the Internet. The IM 130-$n$ may use a standard interface to an Internet provider (i.e. Data Over Cable Service Interface Specifications (DOCSIS), Digital subscriber line (DSL), Canopy, and the like). Although not illustrated in FIG. 1, in an alternate embodiment the radio sites 105-$n$ can be connected to one another through T1's or other types of WANs or LANs, or multiple interconnected WANs or LANs, in place of or in addition to the WAN/LAN 135.

A plurality of base repeater stations BR11 110-1 through BR14 110-4 are located at the first radio site 105-1, a plurality of base repeater stations BR21 111-1 through BR24 111-4 are located at the second radio site 105-2, and a plurality of base repeater stations BR31 112-1 through BR34 112-4 are located at the third radio site 105-3. Each base repeater station 110-$n$ through 112-$n$ may be a base repeater station that is a mobile or fixed (non-mobile), full-duplex or half-duplex, radio frequency (RF) (wireless) modem that transmits and receives control and media (data/voice/video/images/text/etc) to and from one or more subscriber stations on one or more channels. RF resources being shared at radio sites are sometimes also referred to as channels. A channel in a frequency division multiple access (FDMA) system comprises a frequency, while a channel in a time division multiple access (TDMA) system comprises a frequency and a timeslot, and a channel in a code division multiple access (CDMA) system comprises a frequency and a code.

Each of the base repeater stations 110-$n$ through 112-$n$ at a particular radio site are interconnected via one or more wired or wireless connections, and are capable of sharing control and/or media information with one another. Each of the base repeater stations 110-$n$ through 112-$n$ at a particular radio site can receive control and/or media from the WAN/LAN 135 and repeat the information via a corresponding channel of the base repeater station, and can similarly receive control and/or media from a subscriber station and forward the information to other radio sites 105-$n$ via WAN/LAN 135.

A Firewall/NAT/Router (FRN) 125-$n$ is an internet protocol (IP) network device which has combined firewall/NAT/router functionality, optionally located at each network location 105-$n$. For example, FRN1 125-1 is located at the network location 105-1, FRN2 125-2 is located at the network location 105-2, and FRN3 125-3 is located at the network location 105-3. Within each network location 105-$n$, one or more base repeater stations interfaces with the respective FRN device 125-$n$ either directly or indirectly. The FRN 125 serves to provide a means of protection for the associated base repeater stations that are accessible via WAN/LAN 135 (including, in one embodiment, the Public Internet). A system topology where the units are connected over T1's or other types of WANs or LANs may not require FRNs 125. The FRNs 125 can complicate LAN-wide or WAN-wide group call functionality. For example, firewalls and many NATs don't allow unsolicited packets to be received from other hosts, computers, devices, etc. via a WAN such as the Internet.

Note that the network topology of FIG. 1 is for illustrative purposes, and that the system 100 can alternatively include any combination of tiered base repeater stations, routers, switches, and consoles. Furthermore, more than three radio sites or less than three radio sites could be similarly supported based on the present disclosure. Finally, each radio site 105-*n* may include more or less than the four base repeater stations illustrated in an exemplary manner in FIG. 1. Other changes are possible as well.

Within each radio site 105-*n*, one or more subscriber stations 141-*n* can communicate through the respective base repeater stations to other subscriber stations within the system 100. For example, as illustrated in FIG. 1, subscriber stations 141-1 and 141-2 are located within radio site 105-1, subscriber station 141-3 is located within radio site 105-2, and subscriber station 141-4 is located within radio site 105-3. Of course, more or fewer subscriber stations could be present at each radio site 105-*n*.

Figure 2:
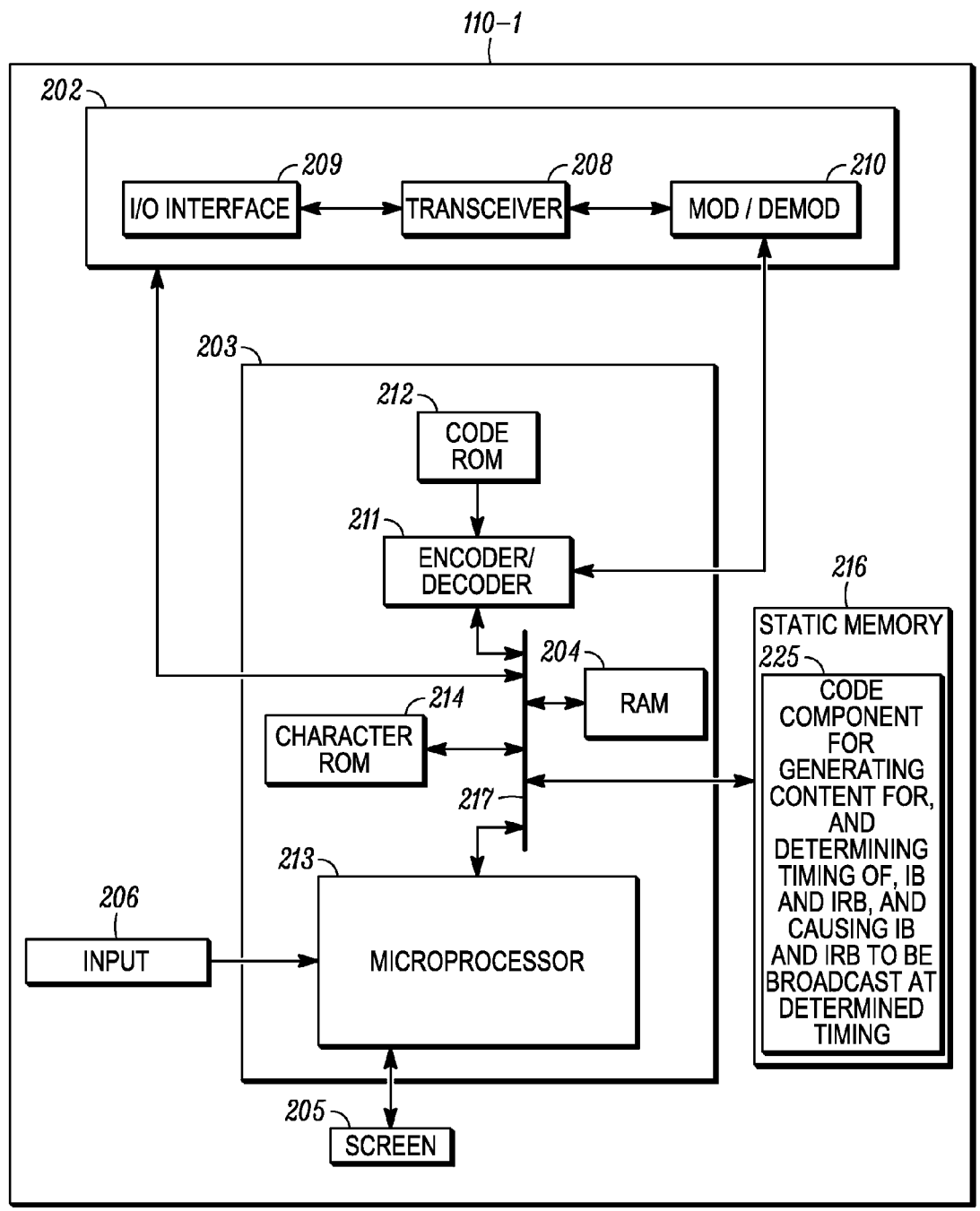
FIG. 2 is an example functional block diagram of a base repeater station operating within the network of FIG. 1 in accordance with some embodiments.

FIG. 2 is an example functional block diagram of a base repeater station BR11 110-1 operating within the system 100 of FIG. 1 in accordance with some embodiments. Other base repeater stations BR12 110-2 through BR34 112-4 may contain same or similar structures. As shown in FIG. 2, base repeater station BR11 110-1 includes a communications unit 202 coupled to a common data and address bus 217 of a processing unit 203. The base repeater station BR11 110-1 may also include an input unit (e.g., keypad, pointing device, etc.) 206 and a display screen 205, each coupled to be in communication with the processing unit 203.

The processing unit 203 may also include an encoder/decoder 211 with an associated code Read Only Memory (ROM) 212 for storing data for encoding and decoding voice, data, control, or other signals that may be transmitted or received between other base repeater stations or subscriber stations in the same radio site 105-1 as base repeater station BR11 110-1, or perhaps between other base repeater stations in a remote radio site such as radio site 105-2. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with subscriber stations such as subscriber station 141-1, with other local base repeater stations such as base repeater station BR12 110-2, and with other remote base repeater stations such as base repeater station BR21 111-1. The communications unit 202 may include one or more wireless transceivers 208, such as a Digital Mobile Radio (DMR) transceiver, a European Terrestrial Trunked Radio (TETRA) transceiver, a P25 or APCO-25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding data such as control channel messages and/or data or voice messages that may be transmitted or received by the base repeater station BR11 110-1. Static memory 216 may store operating code for the microprocessor 213 that generates inter-site roaming beacons (IRBs) and intra-site beacons (IBs), determines a timing for broadcasting the IRBs and IBs, and causes the IRBs and IBs to be broadcast at the determined timing. For example, in some embodiments of the present disclosure, static memory 216 may store operating code that, when executed by the microprocessor 213, perform the base repeater station methods and steps disclosed herein. In one particular example, operating code stored in the static memory 216 may, when executed by microprocessor 213, cause the base repeater station BR11 110-1, at least temporarily acting as the rest channel repeater at the first network location, to (i) determine a first timing at which to broadcast the IB and a second timing at which to broadcast the IRB, the IB including at least a rest channel identifier indicating a current rest channel at the first network location and the IRB including at least remote rest channel repeater information identifying a second repeater at a second network location that is currently acting as a rest channel repeater at the second network location, (ii) broadcast the IB at the first timing, and (iii) broadcast the IRB at the second timing.

Static memory 216 may additionally or alternatively store operating code that performs some or all of the functions of the one of the base repeater stations described with respect to FIGS. 4-8. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 3:
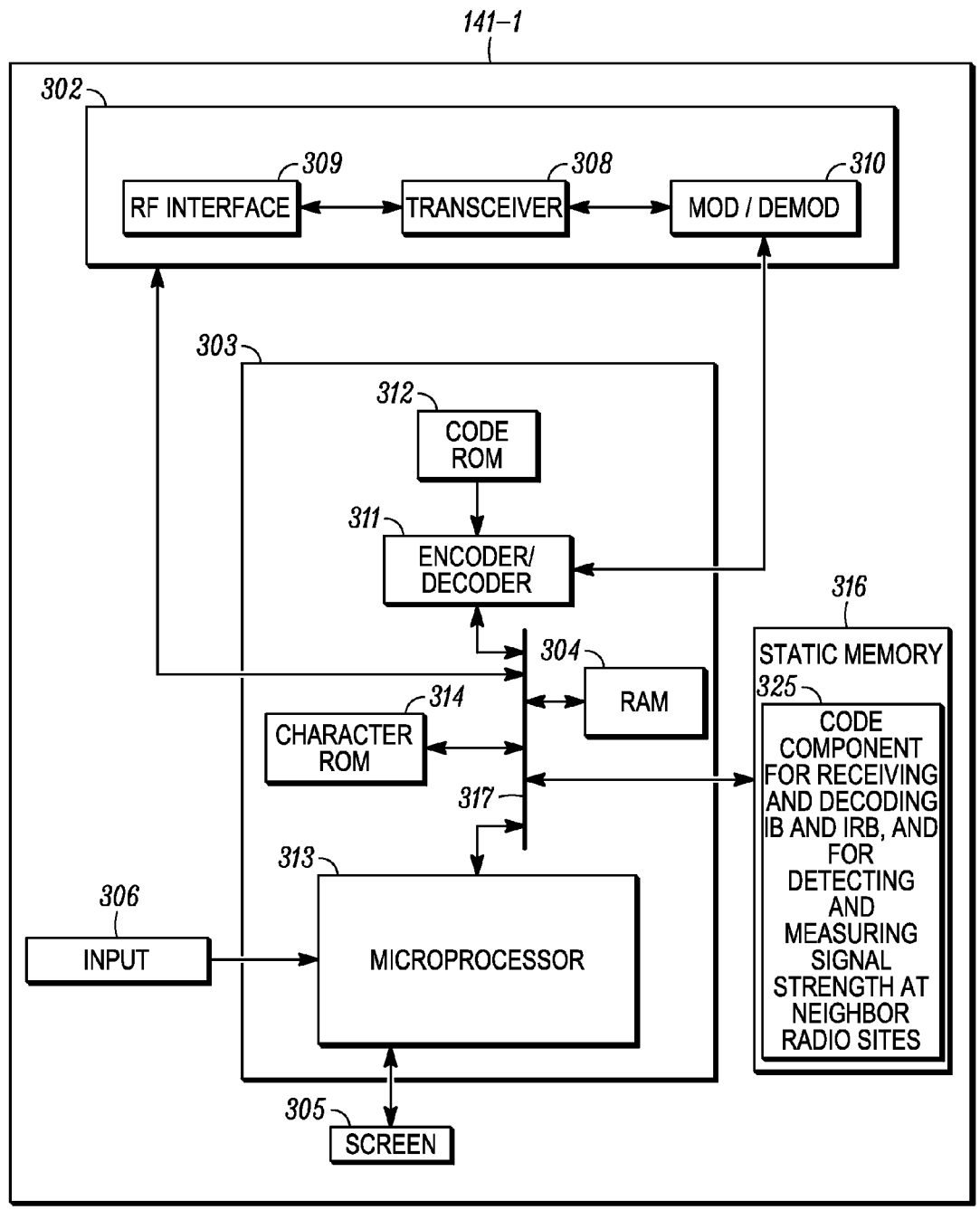
FIG. 3 is an example functional block diagram of a subscriber station operating within the network of FIG. 1 in accordance with some embodiments.

FIG. 3 is an example functional block diagram of a subscriber station 141-1 operating within the system 100 of FIG. 1 in accordance with some embodiments. Other subscriber stations 141-2 through 141-4 may contain same or similar structures. As shown in FIG. 3, subscriber station 141-1 includes a communications unit 302 coupled to a common data and address bus 317 of a processing unit 303. The subscriber station 141-1 may also include an input unit (e.g., keypad, pointing device, etc.) 306 and a display screen 305, each coupled to be in communication with the processing unit 303.

The processing unit 303 may also include an encoder/decoder 311 with an associated code Read Only Memory (ROM) 312 for storing data for encoding and decoding voice, data, control, or other signals that may be transmitted or received between other base repeater stations or subscriber stations in the same radio site 105-1 as subscriber station 141-1, or perhaps between other base repeater stations or subscriber stations in a remote radio site such as radio site 105-2. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include one wireless radio frequency (RF) interfaces 309 that are configurable to communicate with other subscriber stations such as subscriber station 141-2 and with base repeater stations such as base repeater station BR11 110-1. The communications unit 302 may include one or more wireless transceivers 308, such as a Digital Mobile Radio (DMR) transceiver, a European Terrestrial Trunked Radio (TETRA) transceiver, a P25 or APCO-25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as control channel messages and/or data or voice messages that may be transmitted or received by the subscriber station 141-1. Static memory 316 may store operating code for the microprocessor 313 that receives and decodes IRBs and IBs, calculates an expected timing at which IRBs and/or IBs can be detected at neighboring radio sites based on the decoded IRB, and tunes to the IRBs and/or IBs at the neighboring coverage areas, perhaps to measure a signal strength of the neighboring coverage areas as part of a hand-off determination process.

For example, in some embodiments of the present disclosure, static memory 316 may store operating code that, when executed by the microprocessor 313, perform the subscriber station methods and steps disclosed herein. In one example, operating code stored in the static memory 316 may, when executed by microprocessor 313, cause the subscriber station 141-1, to (i) detect a broadcast IB at the radio site 105-1 identifying a current rest channel associated with a base repeater station (e.g., base repeater station BR11 110-1) currently acting as the rest channel repeater at the first network location 105-1, (ii) idle on the identified rest channel and subsequently receive an IRB identifying a second base repeater station (e.g., BR21 111-1) at a second network location (e.g., radio site 105-2) that is currently acting as a rest channel repeater at the second network location, (iii) calculate an expected timing of when one of a second IRB and a second IB is expected to be broadcast by the second repeater at the second network location, and (iv) tune to a rest channel associated with the second repeater at the calculated expected timing. Static memory 316 may store further operating code that, when executed by the microprocessor 313, causes the subscriber station 141-1 to measure a signal strength of the IB and/or IRB received on the rest channel associated with the second repeater and determine whether to hand-off service to the second repeater at the neighboring radio site based on the measurement.

Static memory 216 may additionally or alternatively store operating code that performs all of the functions of the one of the subscriber stations described with respect to FIGS. 4-7 and 9. Static memory 316 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

II. Decentralized Trunked Radio Site Operation

FIGS. 4a-4d provide examples of a decentralized trunked radio channel switching that may be implemented at radio sites 105-n. Two examples will be described with respect to FIGS. 4a-4d, including a first example in which subscriber stations idling on an initial designated rest channel are assigned a new traffic channel for a new group call while remaining subscriber stations stay on the initial designated rest channel, and a second example in which subscriber stations idling on an initial designated rest channel remain on the initial designated rest channel (which is converted to a traffic channel for the new group call) while remaining subscriber stations move to a new designated rest channel different from the initial designated rest channel.

Figure 4A:
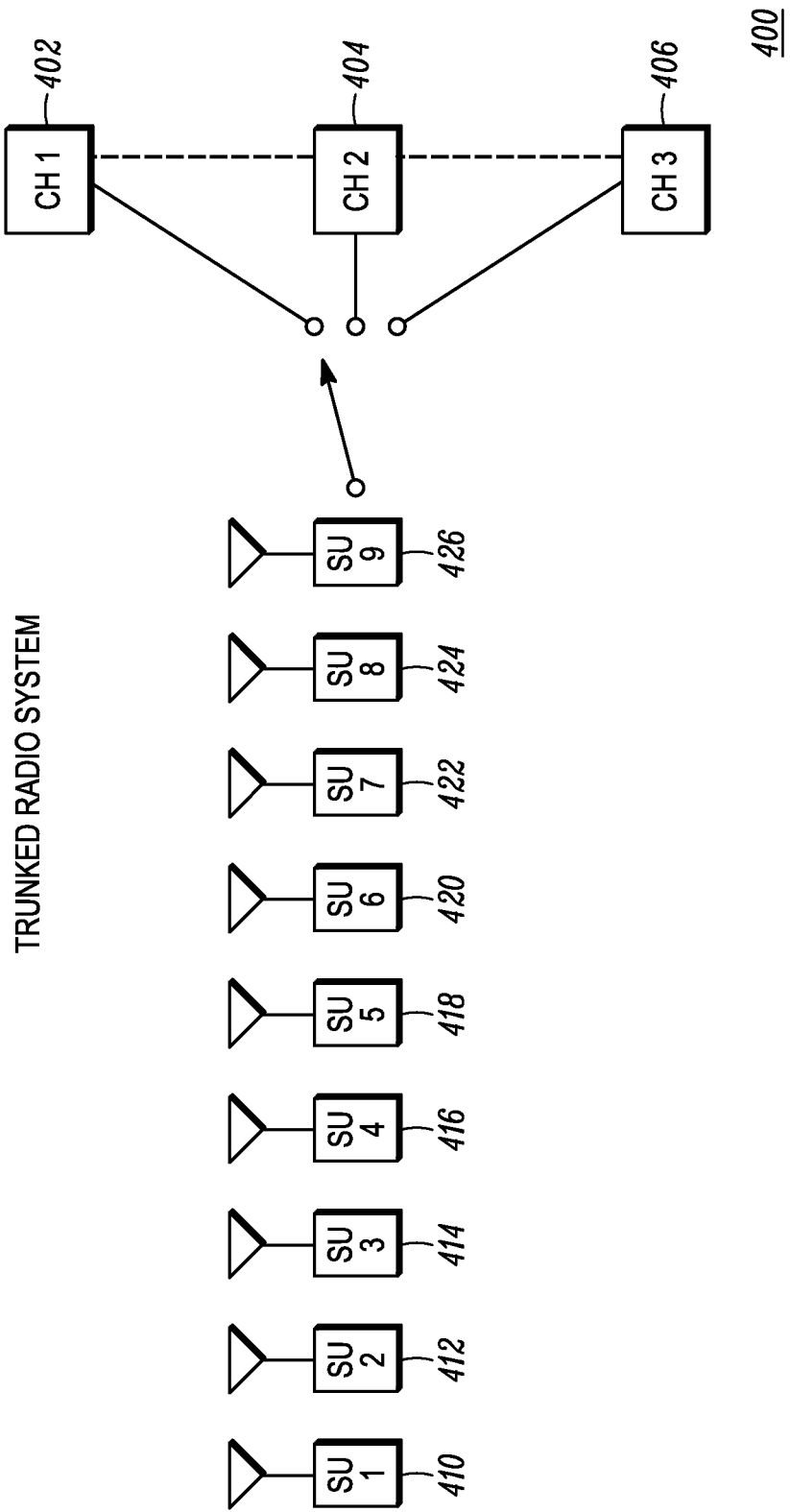
FIGS. 4a through 4d illustrate various decentralized trunked channel assignment operations that may be used at the decentralized trunked radio sites of FIG. 1 in accordance with some embodiments.

As shown in FIG. 4a, an initial configuration of a decentralized trunked radio site 400 may include three channels CH1 402, CH2 404, and CH3 406. Each of the channels CH1-CH3 may correspond to a separate base repeater station. Also included in decentralized trunked radio site 400 is subscriber stations (SUs) SU1 410-SU9 426. Initially, it is assumed that CH1 402 is designated the rest channel (e.g., the channel on which idle subscriber stations are to tune to for new group call information, and which may be identified by a unique synchronization pattern detectable by the SUs). CH1 402 may be designated as a hardcoded default rest channel for decentralized trunked radio site 400, may be elected as an initial rest channel for decentralized trunked radio site 400 via some arbitration procedure between base repeater stations corresponding to channels CH1-CH3, or may be set via some other manner. In other embodiments, CH2 or CH3 could be elected as the initial rest channel for decentralized trunked radio site 400.

Figure 4B:
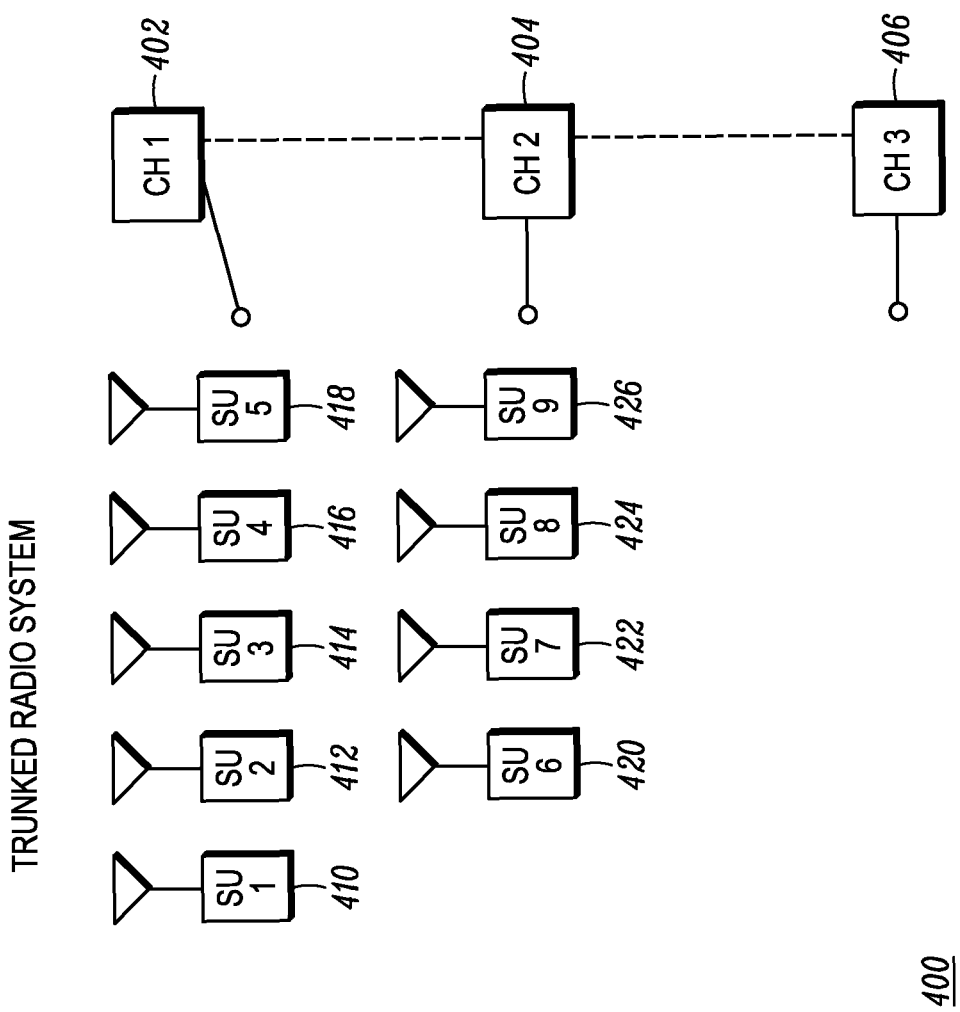

In any event, and as shown in FIG. 4a, all SUs SU1 410-SU9 426 initially detect channel CH1 as the rest channel and idle on rest channel CH1. At some point in time, let us assume that SU6 420 transmits a new call request on rest channel CH1 402. The base repeater station corresponding to rest channel CH1 402 may receive the new call request, determine that CH2 404 is idle and available to handle the new call, and assign the new group call to CH2 404. An announcement is then made on CH1 402 instructing all subscriber stations interested in participating in the new group call to move to the newly assigned traffic channel CH2 404. As shown in FIG. 4b, SUs SU6 420-SU9 426 have moved to the new traffic channel CH2 404 to participate in the new call. Meanwhile, SUs SU1 410-SU5 418, which are not participating in the new call, remain on the initial rest channel CH1 402.

Figure 4C:
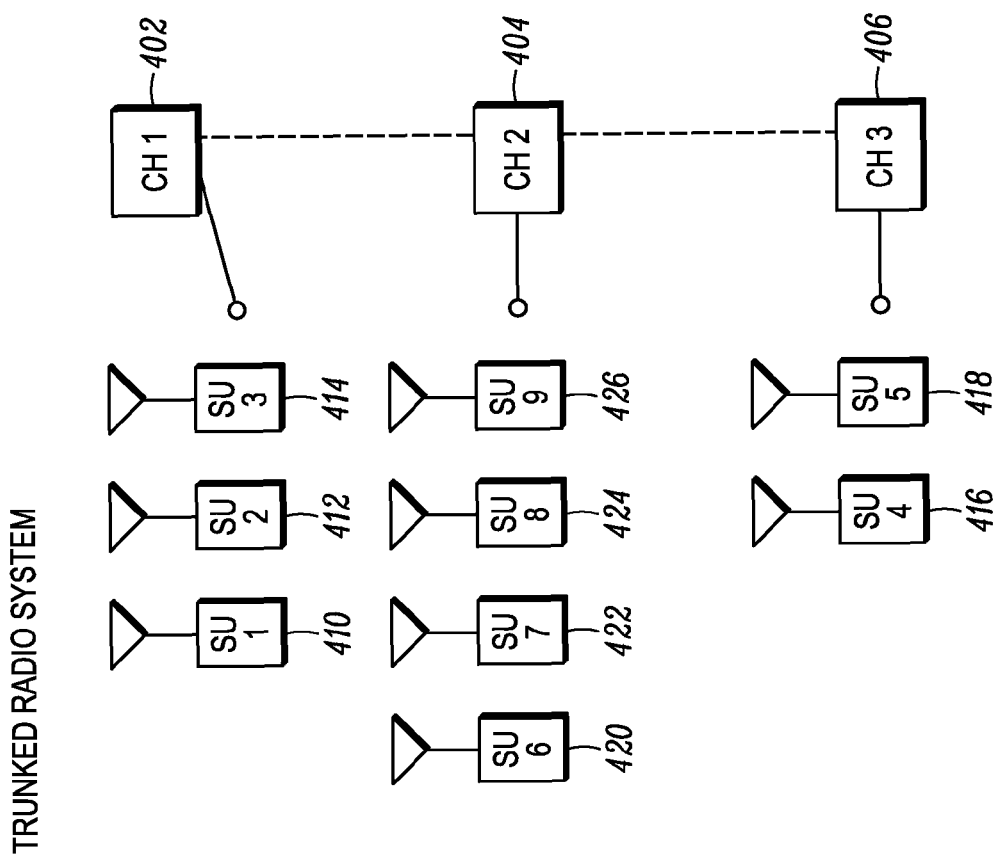

Let us further assume that at some future point in time SU4 416 transmits a second new call request on rest channel CH1 402. The base repeater station corresponding to rest channel CH1 402 may receive the new call request, determine that CH2 404 is busy but that CH3 406 is idle and available to handle the second new call, and assign the second new call to CH3 406. An announcement is then made on CH1 402 instructing all subscriber stations interested in participating in the second new call to move to the newly assigned traffic channel CH3 406. As shown in FIG. 4c, SUs SU4 416-SU5 418 have moved to the new traffic channel CH3 406 to participate in the new call. Meanwhile, SUs SU1 410-SU3 414, which are not participating in the second new call, remain on the initial rest channel CH1 402.

Figure 4D:
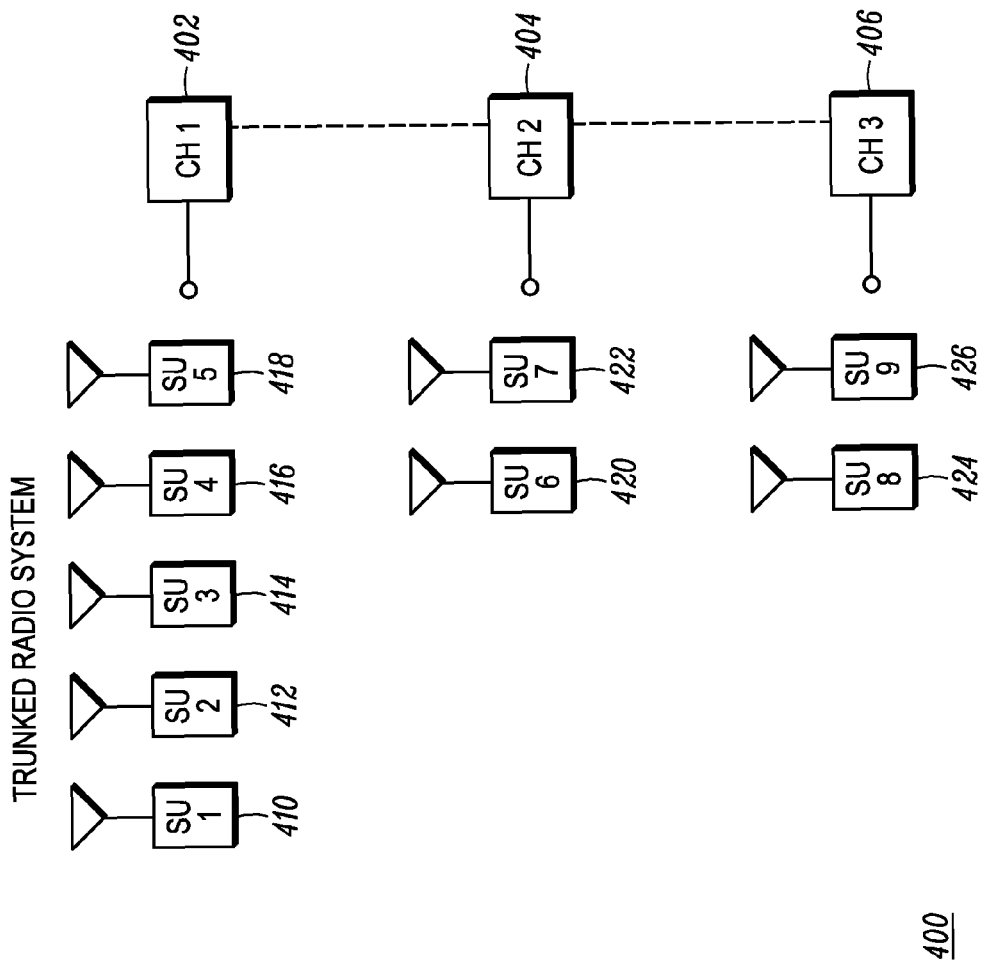

In an alternative way of assigning channels in a decentralized trunked radio system, FIGS. 4a-4b will be relied upon again, but described in a slightly different matter, and FIG. 4d will be relied upon as well. As again shown in FIG. 4a, a decentralized trunked radio site 400 includes three channels CH1 402, CH2 404, and CH3 406. Initially, it is assumed that CH1 402 is designated the current rest channel. CH1 402 may be designated as a hardcoded default rest channel for decentralized trunked radio site 400, may be elected as an initial rest channel for decentralized trunked radio site 400 via some arbitration procedure between base repeater stations corresponding to channels CH1-CH3, or may be set via some other manner. In other embodiments, CH2 or CH3 could be elected as the rest channel for decentralized trunked radio site 400.

In any event, and as shown in FIG. 4*a*, all SUs SU1 410-SU9 426 initially detect rest channel CH1 and idle on rest channel CH1. At some point in time, let us again assume that SU1 410 transmits a new call request on channel CH1 402. In this case, the rest channel CH1 is automatically assigned as the traffic channel for the new group call. Those subscriber stations wishing to participate in the new group call remain on the rest channel (e.g., now a traffic channel for the new call), and the remaining subscriber stations search out a new rest channel, are instructed by the base repeater station corresponding to channel CH1 402 what the new rest channel will be, or perform some other action to determine where to locate the new rest channel. As shown in FIG. 4*b*, SUs SU1 410-SU5 418, which are participating in the new group call, remain on the designated rest channel CH1 402 (e.g., now a traffic channel). SUs SU6 420-SU9 426, meanwhile, have moved to a new rest channel CH2 404 to listen for subsequent new group call notifications.

Let us further assume that at some future point in time SU6 420 transmits a second new group call request on current rest channel CH2 404. In this case, the current rest channel CH2 404 is automatically assigned as the traffic channel for the second new group call. Those subscriber stations wishing to participate in the second new group call remain on the current rest channel CH2 404 (e.g., now a second traffic channel), and the remaining subscriber stations search out a new rest channel, are instructed by the base repeater station corresponding to channel CH2 404 what the new rest channel will be, or perform some other action to determine where to locate the new rest channel. As shown in FIG. 4*d*, SUs SU6 420-SU7 422, which are participating in the second new group call, remain on the current rest channel CH2 404 (e.g., now the second traffic channel). SUs SU8 424-SU9 426, meanwhile, have moved to a new rest channel (in this example, channel CH3 406) to listen for subsequent new group call notifications.

Other examples of decentralized trunked radio site channel distribution and assignment are possible as well. Furthermore, although only three channels are illustrated in FIGS. 4*a*-4*d*, the same concepts can be applied to any number of available channels and/or base repeater stations.

Figure 5:
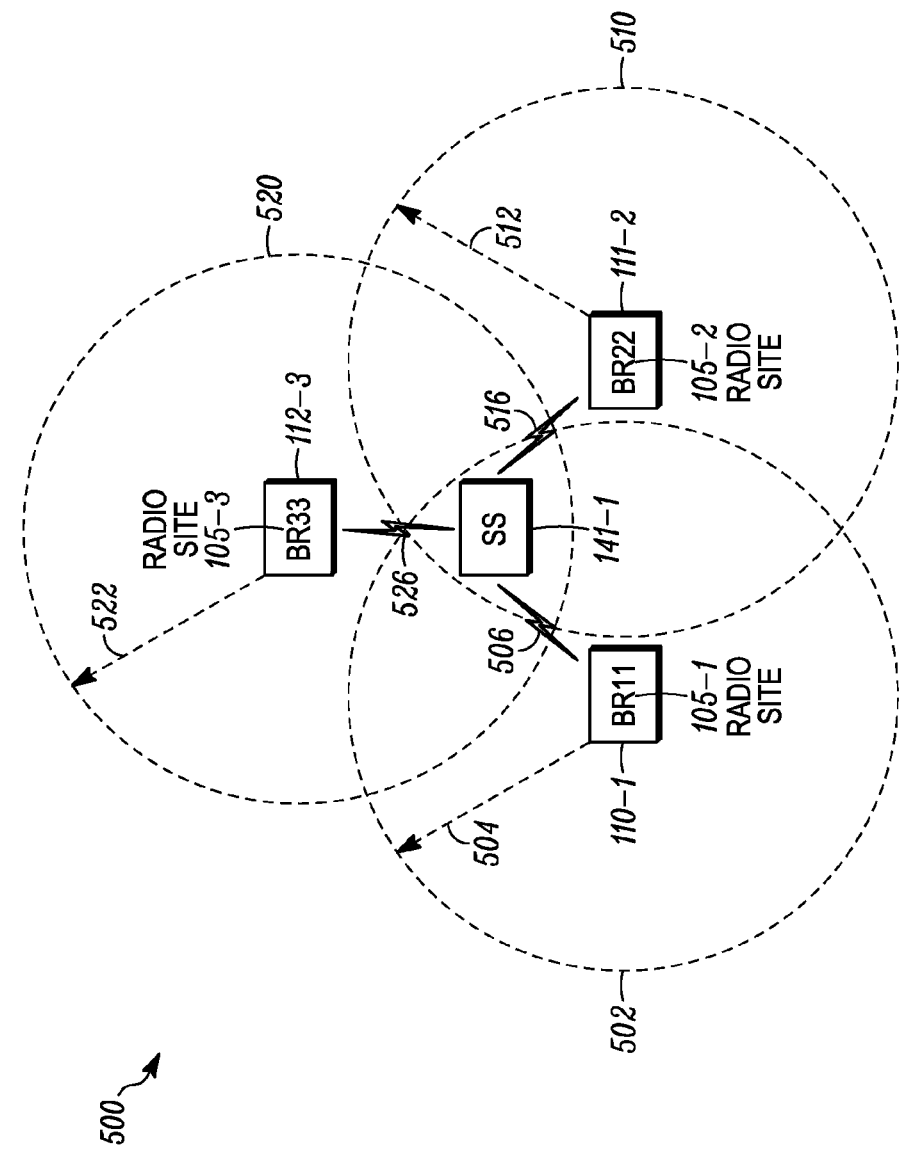
FIG. 5 is a diagram illustrating overlapping geographic coverage areas among which a subscriber station may roam in accordance with some embodiments.
Figure 6:
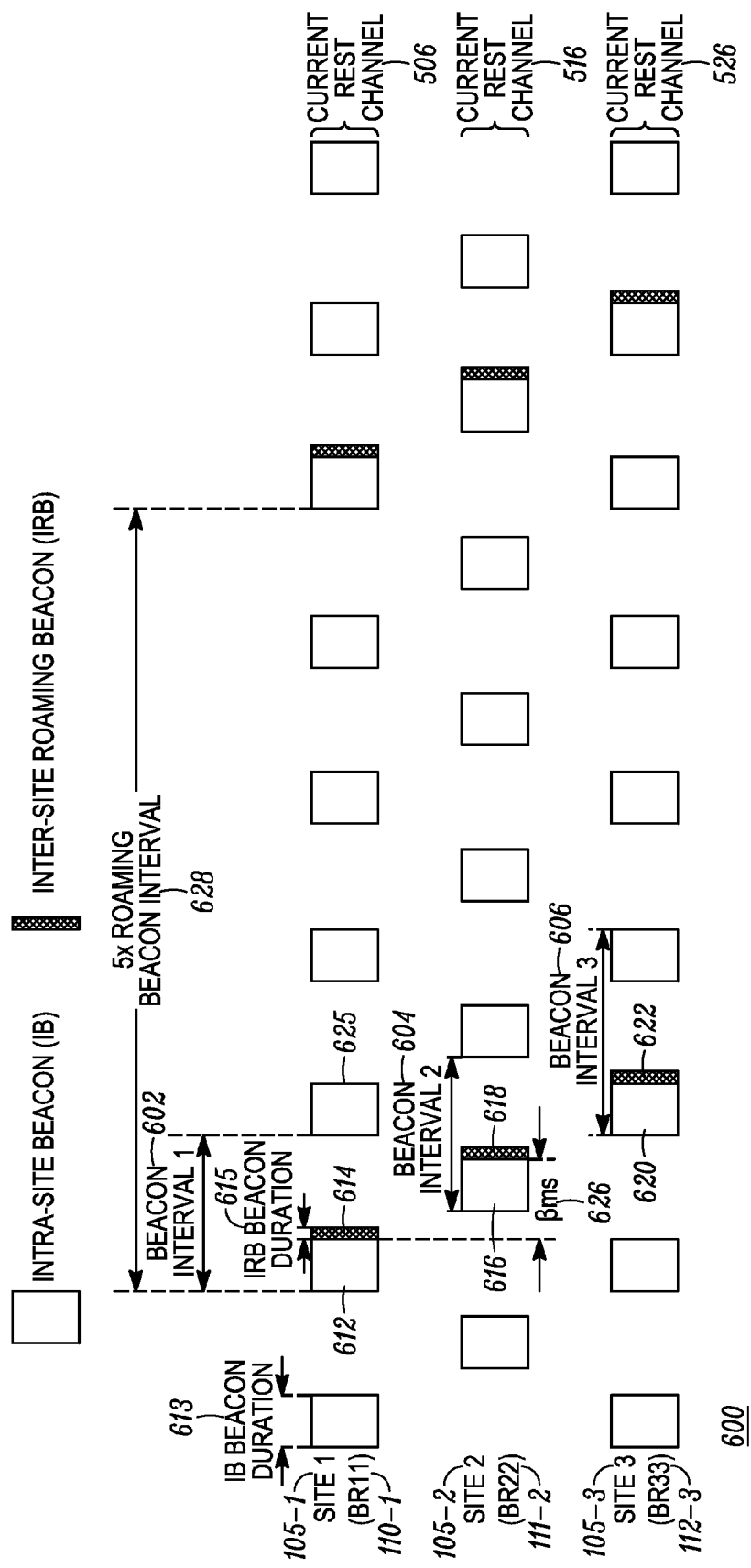
FIG. 6 is a diagram illustrating one example of staggered inter-beacon and intra-beacon broadcasts of the overlapping geographic coverage areas of FIG. 5 in accordance with some embodiments.
Figure 7:
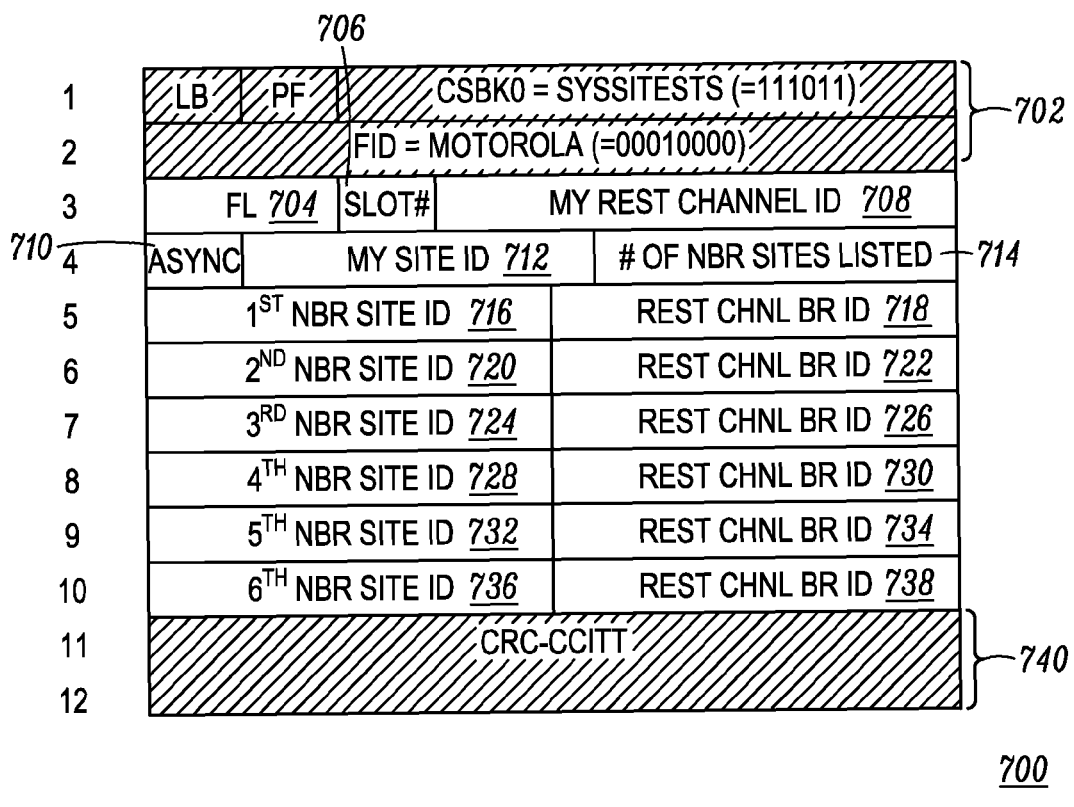
FIG. 7 illustrates one example of an inter-site roaming beacon frame structure in accordance with some embodiments.
Figure 8:
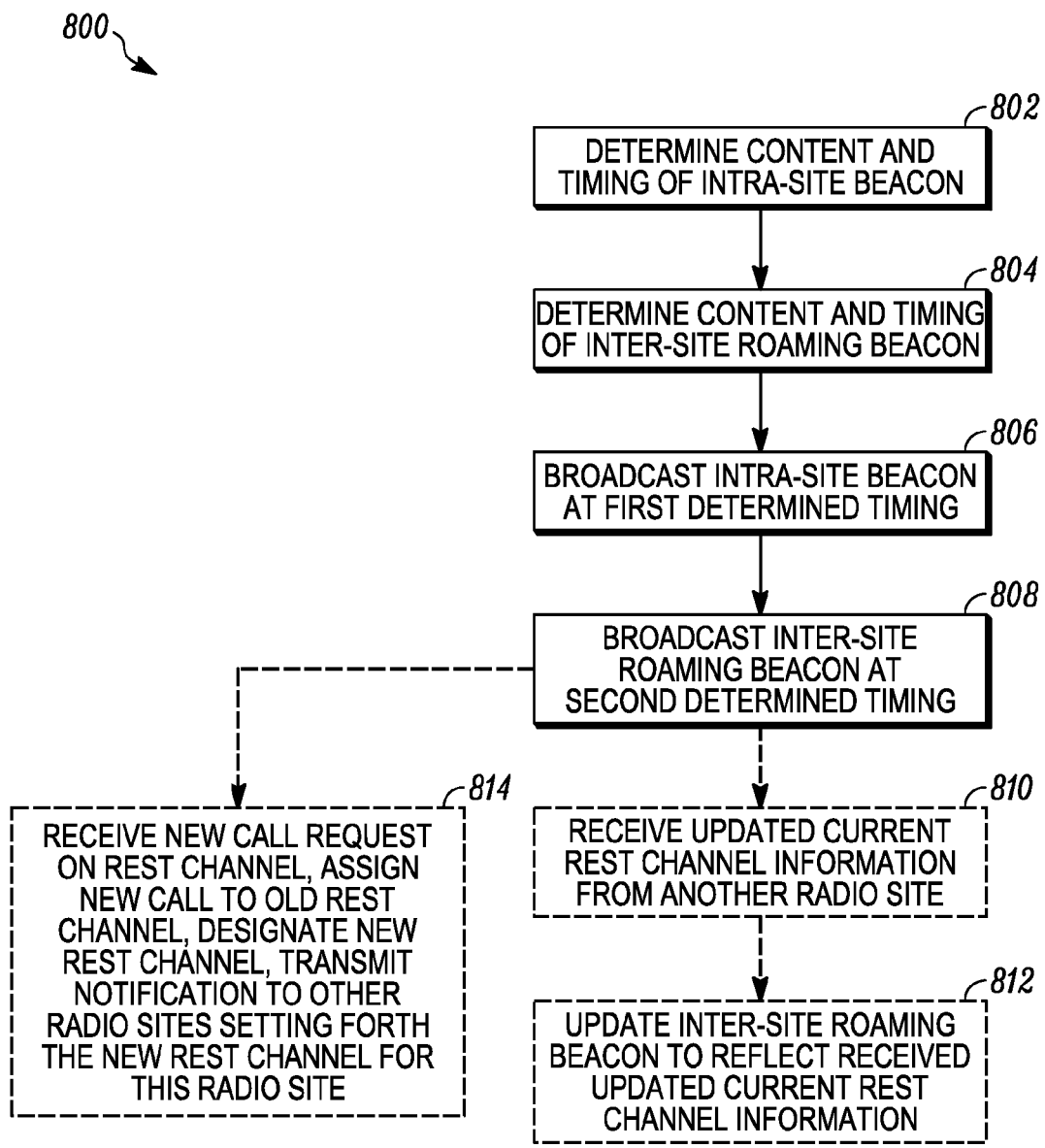
FIG. 8 is a flow diagram illustrating one example of steps executed at a base repeater station in accordance with some embodiments.

III. Roaming Amongst Decentralized Trunked Radio Sites Having Dynamic Rest Channels FIGS. 5-9 illustrate several examples of how decentralized trunked radio sites with dynamic rest channels can aid subscriber stations in determining whether to hand-off in a more efficient manner, and how subscriber stations utilize the aid provided. FIG. 5 describes an embodiment in which radio sites 105-1 through 105-2 provide an overlapping service area 500 through which a subscriber station such as subscriber station 141-1 may roam. FIG. 6 describes an example staggered IB/IRB broadcast interval between neighboring radio sites that may be utilized in accordance with an embodiment. FIG. 7 describes steps which may be executed at a base repeater station in accordance with some embodiments. FIG. 8 sets forth an example IRB frame structure in accordance with an embodiment. And FIG. 9 describes steps which may be executed at a subscriber station in accordance with some embodiments.

FIG. 5 sets forth an example in which radio sites 105-1 through 105-3 provide an overlapping service area 500 through which a subscriber station 141-1 may roam. In the service area 500 as shown in FIG. 5, BR11 110-1 is currently acting as the rest channel repeater at radio site 105-1 and provides a coverage area 502 corresponding to a radio transmission distance 504, BR22 111-2 is currently acting as the rest channel repeater at radio site 105-2 and provides a coverage area 510 corresponding to a radio transmission distance 512, and BR33 112-3 is currently acting as the rest channel repeater at radio site 105-3 and provides a coverage area 520 corresponding to a radio transmission distance 522. While the coverage areas 502, 512, and 522 are illustrated as generally circular-shaped coverage areas for ease of illustration, in practice, coverage areas 502, 512, and 522 will have irregular shapes dependent upon the topography of the surrounding land and the presence of structures such as tall buildings. Furthermore, while only three coverage areas are shown in FIG. 5, more or fewer coverage areas could also be used. Furthermore, the coverage areas 502, 512, and 522 could overlap in different ways than that illustrated in FIG. 5, and in at least one example, one coverage area out of coverage areas 502, 512, and 522 could entirely overlap another coverage area.

As shown in FIG. 5, a subscriber station 141-1 is currently operating within each of the coverage areas 502, 512, and 522. Although subscriber station 141-1 is capable of receiving service from any one of base repeater stations BR11 110-1 (associated with coverage area 502 and radio site 105-1), BR22 111-2 (associated with coverage area 510 and radio site 105-2), and BR33 112-3 (associated with coverage area 520 and radio site 105-3), subscriber station 141-1 will generally only be actively receiving service from a selected one of base repeater stations BR11 110-1, BR22 111-2, and BR33 112-3. For the purposes of this example, let us assume that subscriber station 141-1 is initially idling on a rest channel 506 associated with BR11 110-1 (e.g., BR11 110-1 is currently acting as the rest channel repeater for radio site 110-1) and monitoring the rest channel 506 for new call notifications with which it is associated (and, in one embodiment, for new call notifications that it is not associated so that it may locate a new rest channel associated with radio site 105-1 when the old rest channel is assigned as a traffic channel for the new call). As subscriber station 141-1 is currently receiving service from radio site 105-1, radio site 105-1 may be considered to be subscriber station's 141-1 "home site."

As illustrated in FIG. 5, the subscriber station 141-1 is currently located near an edge of the coverage area 502 associated with radio site 105-1. Accordingly, it would be advantageous for subscribe station 141-1 to begin or continue sampling signals associated with neighboring radio sites (e.g., radio sites 105-2 and 105-3) to determine if neighboring radio sites 105-2 and 105-3 currently, or in the future, can provide a higher signal strength and/or signal quality compared to that provided by radio site 105-1. However, because radio sites 105-2 and 105-3 operate using a dynamically assigned rest channel (e.g., the only channel that is continuously or periodically keyed-up by a radio site and available for signal strength measurements), subscriber station 141-1 must determine what channel is currently being used as the rest channel at each of the neighboring radio sites 105-2 and 105-3 before it can measure a signal strength on the respective rest channels. In this example, let us assume that the current rest channel for radio site 105-2 is rest channel 516 associated with base repeater station BR22 111-1, and that the current rest channel for radio site 105-3 is rest channel 526 associated with base repeater station BR33 112-3. Without prior knowledge of what frequencies, codes, and/or time slots are used by respective rest channels 516 and 526, subscriber station 141-1 would have to stop monitoring rest channel 506 of radio site 110-1 for a period of time while it scans all possible frequencies, codes, and/or time slots used by rest channels 516 and 526, hoping to tune to the respective rest channel at the right time to catch a transmission (such as a beacon) so that it can measure a signal strength. However, during the time period the subscriber station is scanning, it may miss important information transmitted on rest channel 506 of radio site 105-1, such as a new call that is associated with subscriber station 141-1 or the identity of a newly assigned rest channel for radio site 105-1.

In order to allow subscriber station 141-1 to receive an identification of current rest channels at neighboring sites, and to then more quickly and efficiently measure a signal strength of neighboring sites by determining a time that a transmission is most likely to be present at the neighboring site (and thereby minimizing a time away from the home site 105-1), FIG. 6 sets forth an example staggered beacon transmission structure in which a new beacon called an inter-site roaming beacon (IRB) is transmitted by each radio site on an intermittent or periodic basis, in addition to the pre-existing intra-site beacon (IB). As shown in FIG. 6, a base station repeater (e.g., BR11 110-1) at a first radio site (e.g., radio site 105-1) broadcasts an IB at a first beacon interval 602 on a current rest channel 506, a base station repeater (e.g., BR22 111-2) at a second radio site (e.g., radio site 105-2) broadcasts an IB at a second beacon interval 604 on a current rest channel 516, and a base station repeater (e.g., BR33 112-3) at a third radio site (e.g., radio site 105-3) broadcasts an IB at a third beacon interval 606 on a current rest channel 526. As illustrated in FIG. 6, the first through third beacon intervals are the same, and each is offset (e.g., staggered) with respect to at least one other beacon interval. By staggering the beacon intervals in this manner, it makes it easier for a mobile station at one radio site (e.g., the first radio site) to refrain from monitoring the current rest channel 506 at the first radio site and sample a signal strength of a beacon broadcast at another radio site (e.g., the second radio site). In the embodiment shown in FIG. 6, the mobile station 141-1 could sample the signal strength at the second radio site without missing any beacons on the current rest channel 506 of the first radio site.

In FIG. 6, a first IB 612 is shown broadcast at the first site, followed immediately thereafter by a first IRB 614. The first IB 612 is a traditional intra-site status message carrying information for subscriber stations within the coverage area of the base repeater station BR11 110-1, including, for example, identifying a current rest channel, identifying channels with ongoing group calls, and identifying group IDs associated with the ongoing group calls, among other information. The first IRB is an additional beacon frame that is used to identify current rest channels at radio sites other than the home site (e.g., sites other than the first radio site 105-1, which in this example includes second radio site 105-2 and third radio site 105-3).

FIG. 7 illustrates a detailed example of an IRB frame structure 700. In this example, the IRB frame structure 700 comprises 12 bytes of information, including a first two bytes 702 that contain propriety information and identify the frame as an IRB. The first two fields 704, 706 of the third byte allow for chaining of messages if more than one frame is required for a particular IRB (e.g., perhaps in situations where more than 6 Site IDs are required) and provide for a faster method of identifying TDMA timeslots in which an IRB may be transmitted. The third field 708 of the third byte identifies the current rest channel (e.g., rest channel 506 at radio site 105-1 in this example). In the fourth byte, the Async field 710 bit is set to 1 to indicate that the IRB is asynchronous (i.e., the IRB is not transmitted at regular intervals), whereas the Async field 710 bit is set to 0 to indicate that the IRB is periodic (i.e., it is transmitted at a scheduled regular interval). The "My Site Id" field 712 of the fourth byte identifies an assigned site ID for the current radio site (e.g., radio site 105-1). The site ID contained in the My Site Id field 712 may be used by a subscriber station in calculating an expected timing of one or more IBs or IRBs in a neighboring radio site, as will be discussed in more detail with respect to FIG. 9. The "# of Nbr Sites Listed" field 714 lists the number of neighbor sites listed in bytes 5-10 of the IRB frame 700. While the particular IRB frame 700 illustrated in FIG. 7 supports a maximum of 6 neighbor radio sites, in other possible frame structures, more or less than 6 neighbor radio sites can be included. Fields 716, 720, 724, 728, 732, and 736 set forth site ID's for neighbor sites of the home site that is broadcasting the IBR, and fields 718, 722, 726, 730, 734, and 738 set forth a current rest channel of the sites identified in the corresponding fields 716, 720, 724, 728, 732, and 736. In one embodiment, the site IDs provided to radio sites are consecutively numbered and provisioned upon installation. Of course, other methods of provisioning site IDs could be used as well, and other types of IRB frame structure could be used.

Returning to FIG. 6, a second IB 616 is shown broadcast at the second site 105-2, followed immediately thereafter by a second IRB 618. Finally, a third IB 620 is shown broadcast at the third site 105-3, followed immediately thereafter by a third IRB 622. The beacon duration 613 of each IB may be, for example 240 ms or more, and the beacon duration 615 of each IRB may be, for example, 60 ms or more. The time duration $\beta$ 626 between broadcasts of neighboring radio site IRBs may be, for example 660 ms or more. While the time duration $\beta$ 626 between broadcasts of neighboring radio site IRBs may not vary between radio sites, in some embodiments, it may vary. Furthermore, while the beacon duration 613 of each IB and the beacon duration 615 of each IRB may not vary between radio sites, in some embodiments, one or both may vary. Finally, while the IRBs 614, 618, and 622 are illustrated as following immediately after the broadcast of the respective IBs 612, 616, and 620, in other embodiments, the IRBs 614, 618, and 622 may immediately precede the respective IBs 612, 616, and 620, or may be broadcast at some time offset from the beginning or ending of the respective IBs 612, 616, and 620. Other possibilities exist as well.

Because the IRBs are broadcast during time periods that do not overlap with one another, and do not overlap with any other IB transmissions at neighboring radio sites, the IRB broadcast intervals provide for an ideal time or times for a subscriber station 141-1 to tune away from its home radio site and sample signal strengths in one or more neighboring radio sites. While IB 620 is illustrated as being broadcast at a same time as another IB 625 in order to increase the frequency of IB's at radio sites 105-1 through 105-3, in another embodiment, the beacon intervals 602-606 could be extended to prevent overlapping IB broadcasts.

As shown in FIG. 6, the IRBs may not broadcast every time an IB is broadcast. Instead, the IRBs may be broadcast at some multiple of the IB broadcast period, for example, from 2-10 times the IB broadcast interval. In the example set forth in FIG. 6, the IRB broadcast interval 628 is set to five times the IB broadcast interval, in order to reduce the amount of transmit time and power consumption, but still provide updated dynamic rest channel information for neighboring sites. There is, of course, a tradeoff then between the frequency of transmitting IRBs, and the chance that a rest channel has changed at a site in between broadcasts of the IRB. In at least one embodiment, an IRB may be broadcast every time an IB is broadcast.

FIG. 8 sets forth a flow diagram of steps 800 that may be executed at a base repeater station to provide the staggered IB/IRB beacons set forth in FIG. 6. At step 802, a base repeater station determines a content and timing of its IB.

As set forth earlier, the content of the IB may include an identification of a current rest channel in the radio site, an identification of channels with ongoing group calls, and an identification of group IDs associated with the ongoing group calls. This information may be updated on an ongoing basis, as the current rest channel changes, new group calls are started, and/or existing group calls are ended.

The timing of the IB may be pre-provisioned at the base repeater upon installation, or may be based upon an algorithm that varies the timing of the IB based on the radio site ID (e.g., the same radio site ID 712 included in the IRB frame 700). In one example consistent with FIG. 6, all odd radio site IDs may be configured to broadcast at a first pre-provisioned timing, and all even radio site IDs configured to broadcast at a second pre-provisioned timing. In another embodiment, radio sites may multiply their radio site ID by the beacon interval 602, 604, 606 to determine their beacon start time with reference to a reference point (such as a synchronization signal sent by a particular radio site to all other radio sites). In such an embodiment, a radio site with a radio site ID of 0 may begin its beacon interval at time 0 from the reference point. A radio site with a radio site ID of 1 may offset the beginning of its beacon interval from the reference point by the beacon interval (1*beacon interval). A radio site with a radio site ID of 3 may further offset the beginning of its beacon interval from the reference point by 2 times the beacon interval (2*beacon interval). In some embodiments, a modulus function may additionally or alternatively be applied such that some radio sites have a same beacon timing as another radio site. Other ways of determining relative timing are possible as well.

At step 804, the base repeater station determines a content and timing of its IRB. As set forth earlier, the IRB may include, among other information, information identifying neighboring radio sites, and for each listed neighboring radio site, an identification of a current rest channel at the neighboring radio site. The content of the IRB may be generated and updated on an ongoing basis, based on updates to rest channel information received from other radio sites.

The timing of the IRB may be pre-provisioned at the base repeater upon installation, or may be based upon an algorithm that varies the timing of the IRB based on the radio site ID in a manner similar to the IB timing set forth above. For example, to determine an IRB timing, each radio site may simply use a roaming beacon interval multiplication value to determine when to broadcast the IRB relative to the already calculated IB beacon interval. In the example of FIG. 6, the roaming beacon interval multiplication value is 5, and each radio site broadcasts an IRB every 5$^{th}$ IB broadcast. Other roaming beacon interval multiplication values could also be used, and other methods of determining IRB timing could also be used.

At step 806, each radio site broadcasts its IB at the first timing determined at step 802. At step 808, each radio site broadcasts its IRB at the second timing determined at step 804. Given varying relationships between the first and second timings, steps 806 and 808 may be repeated by any given radio site at various points in time in accordance with the determined first and second timings.

At optional step 810, a radio site may receive an updated rest channel information message from another radio site, setting forth either new rest channel information for a new radio site not previously listed in the IRB, or setting forth new rest channel information for a radio site already previously listed in the IRB. At step 812, the radio site receiving the updated rest channel information updates the content of the IRB to reflect the new radio site and/or new rest channel information, and broadcasts the newly updated IRB at a next broadcast interval in accordance with the second timing.

At optional step 814, executed in parallel with or instead of optional steps 810 and 812, a radio site may receive a new call request from a subscriber station on its rest channel. In accordance with one embodiment, and in response to receiving the new call request, the radio site (e.g., one or more of the base repeater stations at the radio site) may assign the rest channel on which the new call request was received to be the traffic channel for the new call (either explicitly or inherently assigned), designate a new channel for the radio site as the new rest channel for the radio site, modify the IB to reflect the new designated channel as the new rest channel, and transmit a notification to other radio sites setting forth the new rest channel so that other radio sites may update their respective IRBs.

Figure 9:
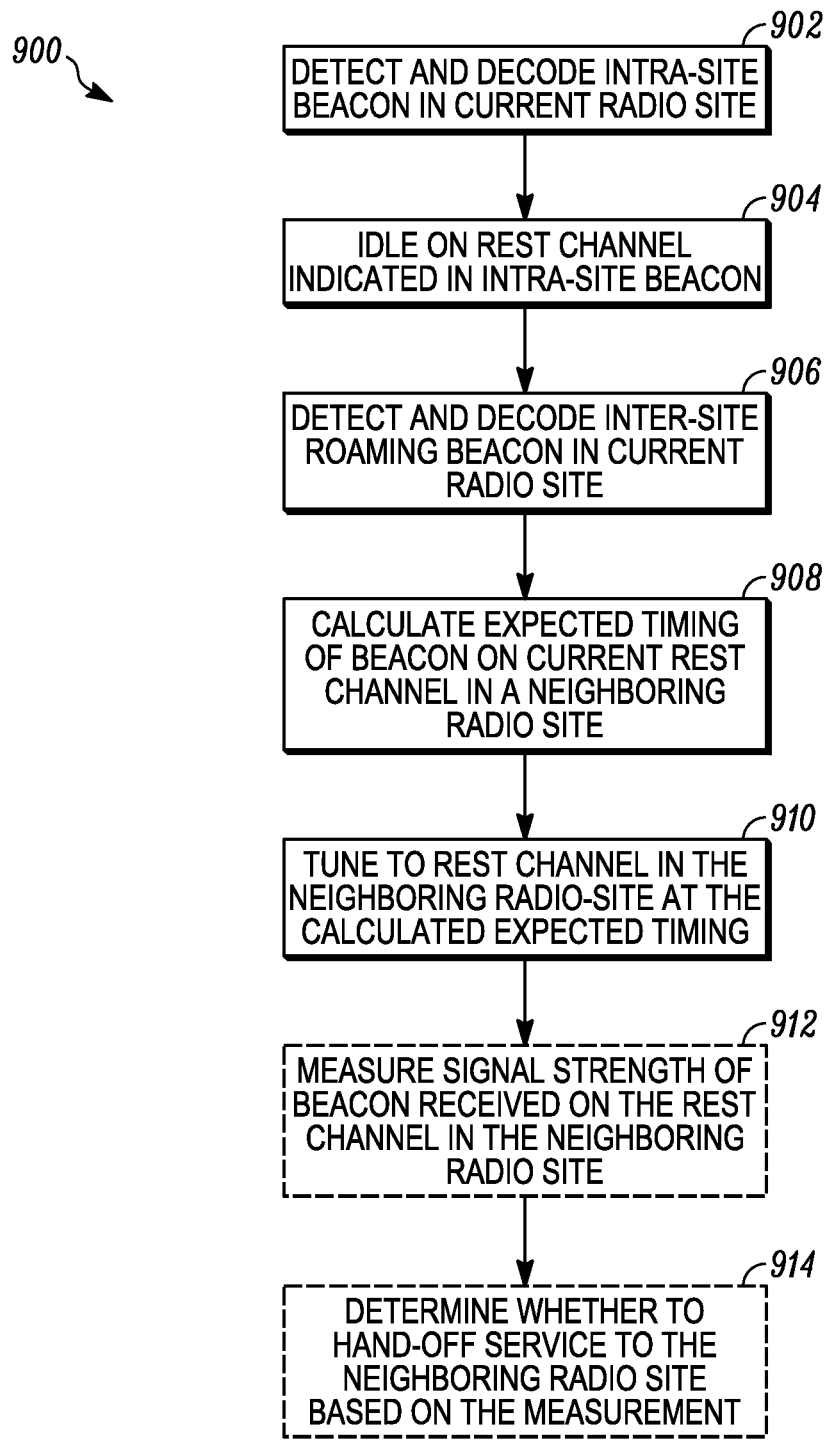
FIG. 9 is a flow diagram illustrating one example of steps executed at a subscriber station in accordance with some embodiments.

FIG. 9 sets forth a flow diagram of steps 900 that may be executed at a subscriber station to receive and process the staggered IB/IRB beacons set forth in FIG. 6, and use received IRB information to more quickly and efficiently measure a signal strength of one or more neighboring dynamic rest-channel radio sites. At step 902, a subscriber station detects, receives, and decodes an IB from a radio site in which it is currently operating and/or receiving service from. At step 904, the subscriber station idles on the rest channel indicated by the IB.

At step 906, the subscriber station receives and decodes an IRB from the radio site in which it is currently operating and/or receiving service from. At step 908, the subscriber station calculates an expected timing of a beacon on a current rest channel of one or more neighboring radio sites based on the information included in the IRB. The subscriber station may execute step 908 (and/or one or more of subsequent steps 910-914) in response to an internally or externally sourced trigger to determine if neighboring radio sites can provide a stronger signal to the subscriber station compared to its current radio site, in response to a loss of signal or increase in interference at its current radio site, or for some other reason. By using information contained in the IRB, the subscriber station can quickly identify a channel (e.g., the rest channel) at each neighboring radio site that is most likely to have a transmission/broadcast that can be used to measure signal strength. Furthermore, using knowledge of the site ID of its current radio site and the site ID of respective neighboring radio sites as set forth in the IRB, the subscriber station can more easily determine when each neighboring radio site is most likely to have a transmission/broadcast on its rest channel that can be used to measure signal strength. (See, for example, FIG. 7, which includes the My Site ID field 712 and neighboring radio site ID information fields 716-738).

In one example, if the current radio site ID is assigned an integer value "m", and a particular neighboring radio site ID is assigned an integer value "n" (e.g., as set forth in the IRB), a subscriber station can determine an expected timing of a transmission/broadcast of an IB at the particular neighboring radio site in accordance with the following equations:

if m<n:

$$(n-m)\beta - \left[\frac{(n-m)\beta}{\alpha}\right]\alpha;$$

if m>n:

$$\left[\frac{(m-n)\beta}{\alpha}\right]\alpha - (m-n)\beta;$$

where β is the pre-determined time duration 626 between broadcasts of neighboring radio site IRBs and α is the beacon interval 602, 604, 606.

In another example, a subscriber station can determine an expected timing of a transmission/broadcast of an IRB at the particular neighboring radio site in accordance with the following equations:

if m<n:

$$(n-m)\beta;$$

if m>n:

$$Y\alpha+(m-n)\beta;$$

where β is the pre-determined time duration 626 between broadcasts of neighboring radio site IRBs, a is the beacon interval 602, 604, 606, and Y is the IRB broadcast interval 628 multiplier.

Using any one or more of the above equations, and information included in the IRB, a subscriber station can determine a channel on which to measure a signal at the particular neighboring radio site having a dynamic rest channel and determine a best timing at which to measure a signal on the determined channel.

At step 910, the subscriber station tunes to the current rest channel in the particular neighboring radio site in accordance with the calculated expected timing. At optional step 912, the subscriber station may then measure a signal strength of a signal associated with an IB and/or IRB received on the current rest channel in the particular neighboring radio site. At step 914, the subscriber station may determine whether to hand-off service to the neighboring radio site based on a comparison between a signal strength received at the subscriber station's home radio site (e.g., before tuning to the neighboring radio site) and the measured signal strength at the neighboring radio site. In one embodiment, the subscriber station may hand-off service to the neighboring radio site if the neighboring radio site can provide a greater signal strength than the subscriber station's home radio site. In another embodiment, the subscriber station may hand-off service to the neighboring radio site if the neighboring radio site can provide a signal strength that is a threshold amount greater than the subscriber station's home radio site. The threshold amount may be, for example, 6 dB or more. Other examples are possible as well.

In some embodiments, steps 912 and 914 may be executed for two or more, or all, neighboring radio sites indicated in the received IRB. In this case, the subscriber station may compare only a neighboring radio site having a highest measured signal strength to the subscriber station's home radio site and hand-off service to the neighboring radio site having the highest measured signal strength as long as it is higher (perhaps by a threshold amount) than the subscriber station's current radio site. In another embodiment, the subscriber station may compare a signal strength measurement of every one of the neighboring radio sites to the subscriber station's current radio site, and hand-off service to the first neighboring radio site that has a measured signal strength that is a threshold amount higher than the subscriber station's current radio site, or hand-off service to the neighboring radio site that has a highest measured signal strength and that is also a threshold amount higher than the subscriber station's current radio site. Other possibilities exist as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD- ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operation of repeaters within a peer to peer trunked radio network, the network comprising a plurality of radio sites, each radio site consisting of a plurality of repeaters in which a dynamically selected one of the repeaters out of the plurality acts as a rest channel repeater for announcing new incoming calls to idling subscriber stations at the respective radio site, the method comprising:

a first repeater at a first radio site, at least temporarily acting as the rest channel repeater at the first radio site, determining a first timing at which to broadcast an intra-site beacon and a second timing at which to broadcast an inter-site roaming beacon, the intra-site beacon including at least a rest channel identifier indicating a rest channel of the first radio site and the inter-site roaming beacon including at least remote rest channel repeater information identifying a second repeater at a second radio site that is currently acting as a rest channel repeater at the second radio site;

the first repeater broadcasting the intra-site beacon at the first timing; and the first repeater broadcasting the inter-site roaming beacon at the second timing.

2. The method of claim 1, further comprising the first repeater receiving a notification from the second radio site, via the peer to peer trunked radio network, that a third repeater is now acting as the rest channel repeater at the second radio site, in place of the second repeater, and responsive to receiving the notification, the first repeater modifying the inter-site roaming beacon to identify the third repeater at the second radio site as currently acting as the rest channel repeater at the second radio site, and continuing to broadcast the inter-site roaming beacon at the second timing.

3. The method of claim 1, further comprising the first repeater receiving a new call request from a first subscriber station at the first radio site and one or more of the plurality of repeaters at the first radio site responsively (i) conducting the new call on the rest channel such that the rest channel becomes a traffic channel for the new call, (ii) assigning a different channel to act as the new rest channel at the first radio site, (iii) modifying the intra-site beacon to reflect the different channel acting as the new rest channel, and (iv) transmitting a notification to the second radio site, via the peer to peer trunked radio network, identifying the new rest channel for inclusion in a second inter-site roaming beacon at the second radio site.

4. The method of claim 1, wherein the first and second timing is determined such that the inter-site roaming beacon is broadcast immediately before or immediately after the intra-site beacon.

5. The method of claim 4, wherein the inter-site roaming beacon and intra-site beacon are broadcast at regular periodic intervals.

6. The method of claim 5, wherein the regular periodic interval is determined as a function of a site identifier assigned to the first radio site and a synchronization signal synchronizing all of the plurality of radio sites.

7. The method of claim 5, wherein the periodic interval of the inter-site roaming beacon broadcast is at least three times as long as the periodic interval of the intra-site beacon broadcast.

8. The method of claim 4, wherein the first timing and the second timing is determined so as to refrain from overlapping in time with respective inter-site roaming beacon broadcasts and respective intra-site beacon broadcasts of at least one radio site adjacent to the first radio site.

9. The method of claim 1, further comprising the second repeater at the second radio site determining a third timing at which to broadcast a second intra-site beacon and a fourth timing at which to broadcast a second inter-site roaming beacon, wherein the first, second, third, and fourth timings are determined so as to refrain from overlapping in time.

10. A method of operation of subscriber stations within a distributed peer to peer trunked radio network, the network comprising a plurality of network locations, each network location consisting of a plurality of repeaters in which a dynamically selected one of the repeaters out of the plurality acts as a rest channel repeater for announcing new incoming calls to idling subscriber stations at the respective network location, the method comprising:

a first subscriber station detecting a broadcast intra-site beacon at the first network location identifying a rest channel associated with a repeater currently acting as the rest channel repeater at the first network location;

the first subscriber station idling on the identified rest channel and subsequently receiving an inter-site roaming beacon identifying a second repeater at a second network location that is currently acting as a rest channel repeater at the second network location;

the first subscriber station calculating an expected timing of when one of a second inter-site roaming beacon and a second intra-site beacon is expected to be broadcast by the second repeater at the second network location; and the first subscriber station tuning to a rest channel associated with the second repeater at the expected timing.

11. The method of claim 10, further comprising the first subscriber station measuring a signal strength of a signal carrying the one of the second inter-site roaming beacon and the second-intra-site beacon while tuned to the rest channel associated with the second repeater, and the first subscriber station making a hand-off determination based at least in part on the measured signal strength.

12. The method of claim 11, further comprising the first subscriber station, based on the measuring, determining that a stronger signal is available from the second repeater, and the first subscriber station responsively handing-off service to the second repeater.

13. The method of claim 10, wherein the first subscriber station calculating the expected timing comprises the first subscriber station determining the expected timing of when a next second intra-site beacon will be broadcast at the second site by (i) determining a site identifier in of the first network location via the intra-site beacon, (ii) determining a site identifier n of the second network location via the inter-site roaming beacon, and (iii)

if m<n, setting the expected timing equal to:

$$(n-m)\beta - \left[\frac{(n-m)\beta}{\alpha}\right]\alpha;$$

if m>n, setting the expected timing equal to:

$$\left[\frac{(m-n)\beta}{\alpha}\right]\alpha - (m-n)\beta;$$

where β is a pre-determined time duration between broadcasts of neighboring radio site inter-site roaming beacons and a is a pit-determined beacon interval between intra-site beacons.

14. The method of claim 13, wherein the values of β and α are pre-configured in the first subscriber station.

15. The method of claim 10, wherein the first subscriber station calculating the expected timing comprises the first subscriber station determining the expected timing of when a next second inter-site roaming beacon will be broadcast at the second site by (i) determining a site identifier in of the first network location via the intra-site beacon, (ii) determining a site identifier n of the second network location via the inter-site roaming beacon, and (iii)

if m<n, setting the expected timing equal to:

(n−m)β;

if m>n, setting the expected timing equal to:

Yα+(m−n)β;

where β is a pre-determined time duration between broadcasts of neighboring radio site inter-site roaming beacons, α is a pre-determined beacon interval between intra-site beacons, and Y is a pre-determined inter-site roaming beacon broadcast interval multiplier.

16. A first repeater at a first radio site within a distributed peer to peer trunked radio network, the network comprising a plurality of radio sites, each radio site consisting of a plurality of repeaters in which a dynamically selected one of the repeaters out of the plurality acts as a rest channel repeater for announcing new incoming calls to idling subscriber stations at the respective radio site, the first repeater comprising:
  a receiver;
  a transmitter;
  a processor; and
  a computer readable medium having instructions stored thereon that, in response to execution by the processor, cause the first repeater to perform operations comprising:
    at least temporarily act as the rest channel repeater at the first radio site, determining a first timing at which to broadcast an intra-site beacon and a second timing at which to broadcast an inter-site roaming beacon, the intra-site beacon including at least a rest channel identifier indicating a rest channel of the first radio site and the inter-site roaming beacon including at least remote rest channel repeater information identifying a second repeater at a second radio site that is currently acting as a rest channel repeater at the second radio site;
    broadcasting the intra-site beacon at the first timing; and
    broadcasting the inter-site roaming beacon at the second timing.

17. The first repeater of claim 16, the operations further comprising:
  receiving a notification from the second radio site, via the peer to peer trunked radio network, that a third repeater is now acting as the rest channel repeater at the second radio site, in place of the second repeater, and
  responsive to receiving the notification, modifying the inter-site roaming beacon to identify the third repeater at the second radio site as currently acting as the rest channel repeater at the second radio site, and continuing to broadcast the inter-site roaming beacon at the second timing.

18. The first repeater of claim 16, the operations further comprising:
  receiving a new call request from a first subscriber station at the first radio site and responsively (i) conducting the new call on the rest channel such that the rest channel becomes a traffic channel for the new call, (ii) assigning a different channel to act as the new rest channel at the first radio site, (iii) causing the intra-site beacon to be modified to reflect the different channel acting as the new rest channel, and (iv) causing a notification to be transmitted to the second radio site, via the peer to peer trunked radio network, identifying the new rest channel for inclusion in a second inter-site roaming beacon at the second radio site.

19. A first subscriber station at a first network location within a distributed peer to peer trunked radio network, the network comprising a plurality of network locations, each network location consisting of a plurality of repeaters in which a dynamically selected one of the repeaters out of the plurality acts as a rest channel repeater for announcing new incoming calls to idling subscriber stations at the respective network location, the first subscriber station comprising:
  a receiver;
  a transmitter;
  a processor; and
  a computer readable medium having instructions stored thereon that, in response to execution by the processor, cause the first subscriber station to perform operations comprising:
    detect a broadcast intra-site beacon at the first network location identifying a rest channel associated with a repeater currently acting as the rest channel repeater at the first network location;
    idle on the identified rest channel and subsequently receive an inter-site roaming beacon identifying a second repeater at a second network location that is currently acting as a rest channel repeater at the second network location;
    calculate an expected timing of when one of a second inter-site roaming beacon and a second intra-site beacon is expected to be broadcast by the second repeater at the second network location; and
    tune to a rest channel associated with the second repeater at the expected timing.

20. The first subscriber station of claim 19, wherein calculating the expected timing comprises determining the expected timing of when a next second intra-site beacon will be broadcast at the second site by (i) determining a site identifier m of the first network location via the intra-site beacon, (ii) determining a site identifier n of the second network location via the inter-site roaming beacon, and (iii)

if m<n, setting the expected timing equal to:

$$(n-m)\beta - \left[\frac{(n-m)\beta}{\alpha}\right]\alpha;$$

if m>n, setting the expected timing equal to:

$$\left[\frac{(m-n)\beta}{\alpha}\right]\alpha - (m-n)\beta;$$

where β is a pre-determined time duration between broadcasts of neighboring radio site inter-site roaming beacons and α is a pre-determined beacon interval between intra-site beacons.

21. The first subscriber station of claim 19, wherein calculating the expected timing comprises determining the expected timing of when a next second inter-site roaming beacon will be broadcast at the second site by (i) determining a site identifier m of the first network location via the intra-site beacon, (ii) determining a site identifier n of the second network location via the inter-site roaming beacon, and (iii)

if m<n, setting the expected timing equal to:

(n−m)β;

if m>n, setting the expected timing equal to:

Yα+(m−n)β;

where β is a pre-determined time duration between broadcasts of neighboring radio site inter-site roaming beacons, a is a pre-determined beacon interval between intra-site beacons, and Y is a pre-determined inter-site roaming beacon broadcast interval multiplier.

* * * * *